Patented Dec. 23, 1952

2,622,979

UNITED STATES PATENT OFFICE 2,622,979

MODIFIED SYNTHETIC RESIN AND PAPER CONTAINING THE SAME

Gerald I. Keim, Lincoln University, Pa., assignor to Hercules Powder Company, Wilmington, Del., a corporation of Delaware No Drawing. Application August 14, 1947, Serial No. 768,715

10 Claims. (Cl. 92—3)

1

This invention relates in general to a modified resin and in particular to the preparation of a lignin sulfonate-modified urea-formaldehyde resin and to the preparation of a paper having improved wet-strength properties by incorporating the resins therein.

It is known that the wet-strength of paper may be improved by incorporating therein a quantity of a urea-formaldehyde resin. In general, the process of adding the resin to the paper is somewhat unsatisfactory because resins of this type are not precipitated during the usual papermaking process. It has been suggested that urea-formaldehyde resins may be modified by amphoteric compounds such as amino acids and the like, whereby the modified resin may be precipitated by alum according to usual paper sizing techniques. Such amphoteric-modified resins have the drawback that the amino acids or similar compounds generally are not readily available in large quantity or are available only at a cost which renders their use in paper sizing uneconomic; however, it was not believed that nonamphoteric modifiers could be substituted without destroying the ability of the modifier to accomplish precipitation in the limited pH range necessitated by usual paper-making procedure.

Now in accordance with the present invention, it has been found that a lignin sulfonate-modified urea-formaldehyde resin may be prepared and that a paper having, for example, improved wet-strength characteristics is produced by incorporating the resin therein. The modified resin is prepared by reacting together urea-formaldehyde and a lignin sulfonate under controlled conditions. The thus modified resin may be incorporated into the paper stock by addition to the beater or addition at a subsequent stage in the papermaking operation and precipitation on the fibers by means of papermaker's alum. The use of the lignin sulfonic acid-modified urea-formaldehyde resin has the advantage that it is prepared from readily available materials and, surprisingly, is capable of precipitation by acidic materials under standard papermaking conditions.

The general nature of the invention having thus been set forth, the following examples are presented in illustration, but not in limitation, of methods of carrying out the invention.

2

EXAMPLE I

One hundred parts of urea and 260 parts of formaldehyde were mixed and brought to pH 7.25 by the addition of sodium hydroxide. The mixture was heated and refluxed for 5 minutes after which there was added 5 parts of sodium lignin sulfonate. The mixture was then refluxed for an additional 5 minutes and the pH then adjusted to 5.2 by the addition of 1 part of 2N formic acid. Refluxing was then continued until the resin had a viscosity of Q (Gardner scale) at which time 100 parts of alcohol was added and the resin cooled to room temperature. The pH of the product was adjusted to 7.72 by the addition of sodium hydroxide. The modified resin product was clear, dark brown in color and soluble in water at moderate concentrations; the product was readily soluble in 5% alcohol.

EXAMPLE II

One hundred twenty parts of urea and 320 parts of formaldehyde were mixed and the pH adjusted to 9.4 with sodium hydroxide. The mixture was heated and refluxed for 30 minutes. Twelve parts of sodium lignin sulfonate was added and the pH adjusted to 5.6 with 2N formic acid. This mixture was then refluxed until it had a viscosity of G (Gardner scale) after which the pH was adjusted to 8.3 with sodium hydroxide. One hundred parts of alcohol was then added and the product cooled to 25° C. The product was clear, dark brown in color and soluble in water at moderate concentrations and readily dispersible in water at greater concentrations. It was readily soluble in 5% aqueous alcohol.

EXAMPLE III

A bleached sulfite pulp beaten to a freeness of 750 cc. (Shopper-Riegler) was treated by the addition of 3 parts of rosin size per hundred parts of pulp and 5 parts of the product of Example I. Papermaker's alum was then added to reduce the pH to 4.5. The thus sized stock was then handsheeted according to conventional procedure.

The paper thus formed was subjected to tensile breaking strength tests using a standard tensile tester and compared with a similar stock containing rosin size but no added resin. The tests included wet tensile strength and dry tensile strength on uncured samples and on paper samples that were cured for 1 hour at 105° C. The results of the tests are shown in Table 1.

*Table 1*

|  | Uncured | | Cured One Hour at 105° C. | |
| --- | --- | --- | --- | --- |
|  | Wet Tensile, lbs./in. | Dry Tensile, lbs./in. | Wet Tensile, lbs./in. | Dry Tensile, lbs./in. |
| Paper Containing 3% size, no resin | 2.5 | 17.0 | 2.8 | 17.6 |
| Paper Containing 3% size, 5% resin | 5.5 | 21.8 | 5.9 | 20.4 |

The lignin sulfonic acid-modified urea-formaldehyde resin used according to this invention may be prepared in a variety of ways. For example, the three ingredients, namely, urea, formaldehyde and the lignin sulfonate may be mixed together and reacted in a one-stage operation as shown in Example I. Alternatively, a two-stage operation may be used as shown in Example II, whereby the urea and formaldehyde are first reacted and subsequently the lignin sulfonate is added and the reaction continued. In the one-stage reaction, the materials are heated at a slightly acid pH (for example, about 4.0 to about 6.5, preferably about 5.0 to about 6.0) while in the two-stage reaction the urea and formaldehyde are first heated at an alkaline pH (for example, 7.0 to 10.0 and preferably between about 8.0 and 9.5) and after the addition of the lignin sulfonate, the mixture is then heated at the weakly acid pH. In either case, the polymerization is stopped at the desired viscosity by the addition of alkali and by cooling. The resulting clear, viscous liquid may be stored for relatively long periods of time, optionally with the addition of small quantities of alcohol or other materials such as, for example, excess formaldehyde, other aldehydes, or the like. The resins so produced are moderately water-soluble and capable of high dilution, but are readily precipitated by the addition of acidic materials such as, for example, papermaker's alum as used in standard papermaking practice.

The proportions of the ingredients in the modified urea-formaldehyde resin may be varied. Thus, for example, for 1 mole of urea, there is used between about 1.8 and about 2.0 moles of formaldehyde, and for 100 parts by weight of urea, there is used about 5 to 20 parts of the lignin sulfonate. When the product is to be subjected to continued storage, there preferably is added about 15 to about 25% by volume of alcohol or the like to increase the water solubility and stability of the resin.

Instead of the sodium lignin sulfonate disclosed in the specific examples, there may be used other lignin sulfonic acid materials such as, for example, lignin sulfonic acid itself or other alkali or alkaline earth salts thereof, and accordingly, the term "lignin sulfonate-modified urea-formaldehyde resin" is understood to designate urea-formaldehyde resins modified with lignin sulfonic acid or its salts. Likewise, the urea may be replaced wholly or in part by such related compounds as guanidine and its derivatives, melamine, substituted diazines and triazines, biuret, biguanide, thiourea and the like.

As pointed out hereinbefore, the lignin sulfonic acid-modified urea-formaldehyde resins have the property of being water-soluble and at the same time precipitable by means of acidic materials such as papermaker's alum, in spite of the fact that the urea-formaldehyde resin is not modified by an amphoteric substance. In addition, the resins are prepared from materials which are readily available in large quantities.

The paper produced with the lignin sulfonic acid-modified urea-formaldehyde resin may be prepared according to usual paper-making operations and is characterized by having good wet-strength characteristics. The resin according to this invention may be added to the paper stock at a point on the wet end of the paper machine. Thus, for example, the resin may be added at the beater engine, jordan, fan pump, headbox, or the like, either together with or separately from rosin size or other sizing material and may be added before or after the addition of alum or optionally simultaneously therewith. The amount of the resin may vary between wide limits, for example, between about 0.1% and 8.0% based on the dry weight of the pulp, preferably in an amount of about 1% to 5%.

It has also been found, surprisingly, that although the lignin sulfonate-modified urea-formaldehyde resins generally are somewhat dark in color, the incorporation of the resin in a paper stock results in a paper having little or no added color. Furthermore, inasmuch as the lignin sulfonate-modified urea-formaldehyde resin cures at a relatively low temperature, the high wet-strength paper can be formed with only mild heating and does not necessarily require a separate curing step over and above the usual papermaking steps.

The high wet-strength paper according to this invention may be used for various paper products such as, for example, towels, napkins, tissues, and the like, wherein an increased degree of wet-strength is desired. The modified resin, in addition to its use in paper is well adapted to other resin uses such as, for example, molding compositions, laminations, general adhesives and the like.

What I claim and desire to protect by Letters Patent is:

1. A thermosetting lignin sulfonate-modified urea-formaldehyde resin prepared from between 1.8 and 2.0 moles of formaldehyde for each mole of urea and between about 5 and about 20 parts by weight of a salt of lignin sulfonic acid for each 100 parts of urea.

2. A process of preparing a thermosetting lignin sulfonate-modified urea-formaldehyde resin comprising reacting together urea, formaldehyde and a salt of lignin sulfonic acid at a pH between about 5.0 and 6.0, the formaldehyde being present in an amount of between 1.8 and 2.0 moles per mole of urea and the salt of lignin sulfonic acid being present in an amount of between about 5 and about 20 parts by weight per 100 parts of urea.

3. A process for preparing a thermosetting lignin sulfonate-modified urea-formaldehyde resin comprising reacting together urea and formaldehyde at a pH of from 8.0 to 9.5, adding a salt of lignin sulfonic acid and reacting the mixture at a pH between about 5.0 and 6.0, said salt of lignin sulfonic acid being employed in an amount of between about 5 and about 20 parts by weight per 100 parts urea and said formaldehyde being employed in an amount of between about 1.8 and 2.0 moles per mole of urea.

4. A high wet-strength paper containing from about 0.1% to about 8%, based on the dry weight of the paper, of a thermosetting lignin sulfonate-modified urea-formaldehyde resin, said lignin sulfonate-modified urea-formaldehyde resin being prepared from between 1.8 and 2.0 moles of formaldehyde for each mole of urea, and between about 5 and about 20 parts by weight of a lignin sulfonic acid material for each 100 parts of urea, said lignin sulfonic acid material being selected from the group consisting of lignin sulfonic acid and salts thereof.

5. A high wet-strength paper comprising matted cellulosic fibers containing about 1% to about 5%, based on the dry weight of the paper, of a lignin sulfonate-modified urea-formaldehyde resin uniformly distributed throughout the paper, said lignin sulfonate-modified urea-formaldehyde resin being prepared from between 1.8 and 2.0 moles of formaldehyde for each mole of urea, and between about 5 and about 20 parts by weight of a lignin sulfonic acid material for each 100 parts of urea, said lignin sulfonic acid material being selected from the group consisting of lignin sulfonic acid and salts thereof.

6. A thermosetting lignin sulfonate-modified urea-formaldehyde resin prepared from between 1.8 and 2.0 moles of formaldehyde for each mole of urea and between about 5 and about 20 parts by weight of a lignin sulfonic acid material for each 100 parts of urea, said lignin sulfonic acid material being selected from the group consisting of lignin sulfonic acid and salts thereof.

7. A thermosetting lignin sulfonate-modified urea-formaldehyde resin prepared from between 1.8 and 2.0 moles of formaldehyde for each mole of urea and between about 5 and about 20 parts by weight of sodium lignin sulfonate for each 100 parts of urea.

8. A process for preparing a thermosetting lignin sulfonate-modified urea-formaldehyde resin comprising reacting together urea, formaldehyde and a lignin sulfonic acid material selected from the group consisting of lignin sulfonic acid and salts thereof, at a pH between about 4.0 and about 6.5, the formaldehyde being present in an amount of between 1.8 and 2.0 moles per mole of urea and the lignin sulfonic acid material being present in an amount of between about 5 and about 20 parts by weight per 100 parts of urea.

9. A process for preparing a thermosetting lignin sulfonate-modified urea-formaldehyde resin comprising reacting together urea and formaldehyde at a pH between about 7.0 and about 10.0, the formaldehyde being present in an amount between about 1.8 and 2.0 moles per mole of urea, adding a lignin sulfonic acid material selected from the group consisting of lignin sulfonic acid and salts thereof and reacting the mixture at a pH between about 4.0 and about 6.5, said lignin sulfonic acid material being employed in an amount between about 5 and about 20 parts by weight per 100 parts of urea.

10. A high wet strength paper containing from about 0.1% to about 8%, based on the dry weight of the paper, of a thermosetting lignin sulfonate-modified urea-formaldehyde resin, said lignin sulfonate-modified urea-formaldehyde resin being prepared from between 1.8 and 2.0 moles of formaldehyde for each mole of urea and between about 5 and about 20 parts by weight of sodium lignin sulfonate for each 100 parts of urea.

GERALD I. KEIM.

REFERENCES CITED

The following references are of record in the file of this patent:

UNITED STATES PATENTS

| Number | Name | Date |
|---|---|---|
| 2,228,567 | John | Jan. 14, 1941 |
| 2,243,481 | Meiler | May 27, 1941 |
| 2,266,265 | Rieche et al. | Dec. 16, 1941 |
| 2,325,302 | Britt | July 27, 1943 |
| 2,338,602 | Schur | Jan. 4, 1944 |
| 2,352,922 | Thomas et al. | July 4, 1944 |
| 2,354,514 | Carson | July 25, 1944 |
| 2,387,619 | Seidel et al. | Oct. 23, 1945 |
| 2,402,469 | Toland et al. | June 18, 1946 |
| 2,456,567 | Scott | Dec. 14, 1948 |
| 2,501,665 | Evans et al. | Mar. 28, 1950 |

OTHER REFERENCES

Collins, Paper Industry and Paper World, June 1943, pages 263 to 269.